US007846853B2

(12) United States Patent
Stevens et al.

(10) Patent No.: US 7,846,853 B2
(45) Date of Patent: Dec. 7, 2010

(54) MULTI-LAYERED PLATELET STRUCTURE

(75) Inventors: Gary Stevens, Surrey (GB); James D. B. Smith, Monroeville, PA (US); John W. Wood, Winter Springs, FL (US); Peter Groeppel, Erlangen (DE)

(73) Assignee: Siemens Energy, Inc., Orlando, FL (US)

( * ) Notice: Subject to any disclaimer, the term of this patent is extended or adjusted under 35 U.S.C. 154(b) by 577 days.

(21) Appl. No.: 11/656,726

(22) Filed: Jan. 23, 2007

(65) Prior Publication Data

US 2007/0141324 A1 Jun. 21, 2007

Related U.S. Application Data

(63) Continuation-in-part of application No. 11/106,846, filed on Apr. 15, 2005.

(51) Int. Cl.
*B32B 5/16* (2006.01)
*B32B 27/04* (2006.01)

(52) U.S. Cl. ....................... 442/117; 442/110; 442/180; 442/417

(58) Field of Classification Search ................. 442/117, 442/417, 110, 180
See application file for complete search history.

(56) References Cited

U.S. PATENT DOCUMENTS

| | | | |
|---|---|---|---|
| 3,246,271 | A | 4/1966 | Ford |
| 3,866,316 | A | 2/1975 | Takechi et al. |
| 3,974,302 | A | 8/1976 | Croop et al. |
| 4,001,616 | A | 1/1977 | Lonseth et al. |
| 4,160,926 | A | 7/1979 | Cope et al. |
| 4,335,367 | A | 6/1982 | Mitsui et al. |
| 4,361,661 | A | 11/1982 | Jackson |
| 4,400,226 | A | 8/1983 | Horrigan |
| 4,427,740 | A | 1/1984 | Stackhouse et al. |
| 4,491,618 | A * | 1/1985 | Kuwajima et al. .......... 442/296 |
| 4,634,911 | A | 1/1987 | Studniarz et al. |

(Continued)

FOREIGN PATENT DOCUMENTS

EP 0 157 936 A1 10/1985

(Continued)

OTHER PUBLICATIONS

Yasufumi Shibata, Takenobu Sakai, Shingo Katayama, Noriko Yamada; "Lipophilic Inorganic-Organic Hybrid Materials with Low Frictional Coefficient Useful for Sliding Parts such as Piston Rings"; Jul. 31, 2002; pp. 1-3; STN Database No. 2002: 1568167; XP-002355912.

(Continued)

*Primary Examiner*—Andrew T Piziali

(57) ABSTRACT

An electrical insulation paper that is made of mica flakelets (22), having an average size range of 0.01 to 0.05 mm in their thinnest dimension, hexagonal boron nitride (26), which has an average size range of 10 to 1,000 nm in their longest dimension, and a resin matrix. The mica flakelets and the hexagonal boron nitride are mixed and formed into a paper (17), and the resin is added to the paper after formation, the ratio by weight of the hexagonal boron nitride to the mica flakelets is directly proportional to the average size of the hexagonal boron nitride compared to the average size of the mica flakelets, within an adjustment factor.

10 Claims, 2 Drawing Sheets

U.S. PATENT DOCUMENTS

| | | | |
|---|---|---|---|
| 4,694,064 | A | 9/1987 | Tomalia et al. |
| 4,704,322 | A | 11/1987 | Roberts |
| 4,760,296 | A | 7/1988 | Johnston et al. |
| 4,806,806 | A | 2/1989 | Hojrtsberg et al. |
| 5,011,872 | A | 4/1991 | Latham et al. |
| 5,037,876 | A | 8/1991 | Birkle et al. |
| 5,126,192 | A | 6/1992 | Chellis et al. |
| 5,281,388 | A | 1/1994 | Palmer et al. |
| 5,466,431 | A | 11/1995 | Dorfman et al. |
| 5,510,174 | A | 4/1996 | Litman |
| 5,540,969 | A | 7/1996 | Schuler |
| 5,578,901 | A | 11/1996 | Blanchet-Fincher et al. |
| 5,688,382 | A | 11/1997 | Besen et al. |
| 5,723,920 | A | 3/1998 | Markovitz et al. |
| 5,780,119 | A | 7/1998 | Dearnaley et al. |
| 5,801,334 | A | 9/1998 | Theodorides |
| 5,878,620 | A | 3/1999 | Gilbert et al. |
| 5,904,984 | A | 5/1999 | Smith et al. |
| 5,938,934 | A | 8/1999 | Balogh et al. |
| 5,982,056 | A | 11/1999 | Koyama et al. |
| 6,015,597 | A | 1/2000 | David |
| 6,048,919 | A | 4/2000 | McCullough |
| 6,103,382 | A | 8/2000 | Smith et al. |
| 6,130,495 | A | 10/2000 | Schulten et al. |
| 6,130,496 | A | 10/2000 | Takigawa et al. |
| 6,140,590 | A | 10/2000 | Baumann et al. |
| 6,160,042 | A | 12/2000 | Ishida |
| 6,190,775 | B1 | 2/2001 | Smith et al. |
| 6,238,790 | B1 | 5/2001 | Smith et al. |
| 6,251,978 | B1 | 6/2001 | McCullough |
| 6,255,738 | B1 | 7/2001 | Distefano et al. |
| 6,261,424 | B1 | 7/2001 | Goncharenko et al. |
| 6,261,481 | B1 | 7/2001 | Akatsuka et al. |
| 6,265,068 | B1 | 7/2001 | David et al. |
| 6,288,341 | B1 | 9/2001 | Tsunoda et al. |
| 6,344,271 | B1 | 2/2002 | Yadav et al. |
| 6,359,232 | B1 | 3/2002 | Markovitz et al. |
| 6,393,642 | B1 | 5/2002 | Pollman et al. |
| 6,396,864 | B1 | 5/2002 | O'Brien et al. |
| 6,432,537 | B1 | 8/2002 | Devlin et al. |
| 6,504,102 | B2 | 1/2003 | Tsunoda et al. |
| 6,506,331 | B2 | 1/2003 | Meguriya |
| 6,509,063 | B1 | 1/2003 | McCarthy et al. |
| 6,548,172 | B2 | 4/2003 | David et al. |
| 6,572,937 | B2 | 6/2003 | Hakovirta et al. |
| 6,632,561 | B1 | 10/2003 | Bauer et al. |
| 6,635,720 | B1 | 10/2003 | Tomalia et al. |
| 6,746,758 | B2 | 6/2004 | Tsunoda et al. |
| 6,821,672 | B2 | 11/2004 | Zguris |
| 6,882,094 | B2 | 4/2005 | Dimitrijevic et al. |
| 6,905,655 | B2 | 6/2005 | Gabriel et al. |
| 6,974,627 | B2 | 12/2005 | Morita et al. |
| 7,033,670 | B2 | 4/2006 | Smith |
| 7,042,346 | B2 | 5/2006 | Paulsen |
| 7,120,993 | B2 | 10/2006 | Yamamoto et al. |
| 7,180,409 | B2 | 2/2007 | Brey |
| 7,189,778 | B2 | 3/2007 | Tobita et al. |
| 7,425,366 | B2 | 9/2008 | Okamoto et al. |
| 2002/0058140 | A1 | 5/2002 | Dana et al. |
| 2002/0070621 | A1 | 6/2002 | Mori et al. |
| 2002/0098285 | A1 | 7/2002 | Hakovirta et al. |
| 2002/0146562 | A1 | 10/2002 | Morita et al. |
| 2003/0035960 | A1 | 2/2003 | Tsunoda et al. |
| 2003/0040563 | A1 | 2/2003 | Sagal et al. |
| 2003/0139510 | A1 | 7/2003 | Sagal et al. |
| 2004/0094325 | A1 | 5/2004 | Yoshida et al. |
| 2004/0102597 | A1 | 5/2004 | Tobita et al. |
| 2004/0152829 | A1 | 8/2004 | Tobita et al. |
| 2004/0241439 | A1 | 12/2004 | Morita et al. |
| 2005/0097726 | A1 | 5/2005 | Yamamoto et al. |
| 2005/0116336 | A1 | 6/2005 | Chopra et al. |
| 2005/0161210 | A1 | 7/2005 | Zhong et al. |
| 2005/0208301 | A1 | 9/2005 | Okamoto et al. |
| 2005/0236606 | A1 | 10/2005 | Toas et al. |
| 2005/0245644 | A1 | 11/2005 | Smith et al. |
| 2005/0274450 | A1 | 12/2005 | Smith et al. |
| 2005/0274540 | A1 | 12/2005 | Smith et al. |
| 2005/0274774 | A1 | 12/2005 | Smith et al. |
| 2005/0277349 | A1 | 12/2005 | Smith et al. |
| 2005/0277350 | A1 | 12/2005 | Smith et al. |
| 2005/0277351 | A1 | 12/2005 | Smith et al. |
| 2005/0277721 | A1 | 12/2005 | Smith et al. |
| 2006/0034787 | A1 | 2/2006 | Bujard |
| 2006/0142471 | A1 | 6/2006 | Shindo |
| 2006/0231201 | A1 | 10/2006 | Smith et al. |
| 2006/0234027 | A1 | 10/2006 | Huusken |
| 2006/0234576 | A1 | 10/2006 | Smith et al. |
| 2006/0258791 | A1 | 11/2006 | Okamoto et al. |
| 2006/0280873 | A1 | 12/2006 | Smith et al. |
| 2006/0281380 | A1 | 12/2006 | Smith et al. |
| 2006/0281833 | A1 | 12/2006 | Smith et al. |
| 2007/0026221 | A1 | 2/2007 | Stevens et al. |
| 2007/0114704 | A1 | 5/2007 | Stevens et al. |
| 2007/0141324 | A1 | 6/2007 | Stevens et al. |
| 2008/0050580 | A1 | 2/2008 | Stevens et al. |
| 2008/0066942 | A1 | 3/2008 | Miller |
| 2008/0262128 | A1 | 10/2008 | Stevens et al. |

FOREIGN PATENT DOCUMENTS

| | | | |
|---|---|---|---|
| EP | 0 266 602 | A1 | 5/1988 |
| EP | 0 394 767 | A2 | 10/1990 |
| EP | 0 604 804 | A2 | 7/1994 |
| EP | 1220240 | A1 | 3/2002 |
| EP | 1 300 439 | A1 | 4/2003 |
| EP | 1 383 226 | A1 | 1/2004 |
| EP | 1 384 567 | A1 | 1/2004 |
| EP | 1 486 997 | A1 | 12/2004 |
| EP | 1 530 223 | A1 | 5/2005 |
| GB | 881036 | A2 | 11/1961 |
| JP | 5553802 | A | 10/1978 |
| JP | 56029305 | | 3/1981 |
| JP | 03205443 | A | 9/1991 |
| JP | 06076624 | A | 3/1994 |
| JP | 06313267 | A | 11/1994 |
| JP | 08-020673 | | 1/1996 |
| JP | 10-088201 | | 4/1998 |
| JP | 10-211659 | | 8/1998 |
| JP | 2002212422 | A | 7/2002 |
| JP | 2002322243 | A | 11/2002 |
| JP | 200506389 | A | 1/2005 |
| JP | 2005-199562 | A | 7/2005 |
| WO | WO 95/02504 | A1 | 1/1995 |
| WO | WO 96/28073 | A1 | 9/1996 |
| WO | WO 98/41993 | A1 | 9/1998 |
| WO | WO 99/26286 | A1 | 5/1999 |
| WO | WO 00/56127 | A1 | 9/2000 |
| WO | WO 01/68749 | A1 | 9/2001 |
| WO | WO 01/84659 | A1 | 11/2001 |
| WO | WO 03/040445 | A1 | 5/2003 |
| WO | WO 2004/006271 | A1 | 1/2004 |
| WO | WO 2004/052999 | A2 | 6/2004 |
| WO | WO 2004/067606 | A1 | 8/2004 |
| WO | WO 2005/069312 | | 7/2005 |
| WO | WO 2005/106089 | A2 | 11/2005 |
| WO | WO 2005/123825 | A2 | 12/2005 |
| WO | WO 2005/124790 | A2 | 12/2005 |
| WO | WO 2006/002014 | A1 | 1/2006 |
| WO | WO 2006/007385 | A1 | 1/2006 |

OTHER PUBLICATIONS

Tomoyuki Matsumura, Ryuji Takahashi, Kazuya Nagata, Mitsukazu Ochi; "Phase Structures and Thermal and Conductive Properties of Epoxy-Alumina Hybrids Filled with Conductive Fillers"; Apr. 8, 2002; pp. 1-2; STN Database No. 2002:257918; XP-002356007.

Von Roll / Isola; "Mica Tapes"; Product literature Samicapor® HTC 381.58; p. 1.

Tari et al., "Impacts on Turbine Generator Design by the Application of Increased Thermal Conducting Stator Insulation" Cigre SC11-01 Meeting, Paper No. 132 (2002).

Sun et al., "Fundamental Research on Surface Modification of Nano-sized Silica for Underfill Applications" 2004 Electronic Components and Technology Conference (2004).

Brutsch et al., "New High Voltage Insulation with Increased Thermal Conductivity" Electrical Electronics Insulation Conference 1993 Proceedings, (Oct. 1993).

Tari et al., "A High Voltage System with Increased Thermal Conductivity for Turbo Generators" Coil Winding, Insulation and Electrical Manufacturing Conference (2001).

Derwent Acc-No. 1980-39239C (JP 55053802 A Derwent Abstract) (Nippon Mica Seisaku).

Product Data Sheet for Polar Therm Boron Nitride Powder Grades PT120, PT140, PT160, and PT 180, provided by Momentive Performance Materials (2007).

POSS® Enhanced Thermosets, Product Brochure from Hybrid Products, Inc., date unknown.

Production Information Sheet for D.E.R.™ 330 (Liquid Epoxy Resin) from The Dow Chemical Co., date unknown.

* cited by examiner

MULTI-LAYERED PLATELET STRUCTURE

CROSS-REFERENCE TO RELATED APPLICATIONS

This application is a continuation-in-part of U.S. application Ser. No. 11/106,846, "Insulation Paper with High Thermal Conductivity Materials" filed Apr. 15, 2005, by Smith, et al., which is incorporated herein by reference.

FIELD OF THE INVENTION

The field of the invention relates to the fillers within a host resin matrix and their interaction therewith.

BACKGROUND

With the use of electrical appliances, there is a need to electrically insulate conductors. With the push to continuously reduce the size and to streamline electrical and electronic systems there is a corresponding need to find better and more compact insulators and insulation systems.

Various epoxy resin materials have been used extensively in electrical insulation systems due to their practical benefit of being tough and flexible electrical insulation materials that can be easily adhered to surfaces. Traditional electrical insulation materials, such as mica flake and glass fiber, can be surface coated and bonded with these epoxy resins, to produce composite materials with increased mechanical strength, chemical resistance and electrical insulating properties. In many cases epoxy resins have replaced traditional varnishes despite such materials having continued use in some high voltage electrical equipment.

Good electrical insulators, by their very nature, also tend to be good thermal insulators, which is undesirable. Thermal insulating behavior, particularly for air-cooled electrical equipment and components, reduces the efficiency and durability of the components as well as the equipment as a whole. It is desirable to produce electrical insulation systems having maximum electrical insulation and minimal thermal insulation characteristics.

Electrical insulation often appears in the form of insulating tapes, which themselves have various layers. Common to these types of tapes is a paper layer that is bonded at an interface to a fiber layer, both layers tending to be impregnated with a resin. A favored type of insulation material is a mica-tape. Improvements to mica tapes include catalyzed mica tapes as taught in U.S. Pat. No. 6,103,882. The mica-tape may be wound around conductors to provide extremely good electrical insulation. An example of this is shown in FIG. 1. Illustrated here is a coil 13, comprising a plurality of turns of conductors 14, which in the example illustrated here are assembled into a bakelized coil. The turn insulation 15 is prepared from a fibrous material, for example glass or glass and Dacron which is heat treated. Ground insulation for the coil is provided by wrapping one or more layers of composite mica tape 16 about the bakelized coil 14. Such composite tape may be a paper or felt of small mica flakes combined with a pliable backing sheet 18 of, for example, glass fiber cloth or polyethylene glycol terephthalate mat, the layer of mica 20 being bonded thereto by a liquid resinous binder. Generally, a plurality of layers of the composite tape 16 are wrapped about the coil depending upon voltage requirements. A wrapping of an outer tape 21 of a tough fibrous material, for example, glass fiber, may be applied to the coil.

Generally, multiple layers of the mica tape 16 are wrapped about the coil with sixteen or more layers generally being used for high voltage coils. Resins are then impregnated into the tape layers. Resins can even be used as insulation independently from the insulating tape. Unfortunately this amount of insulation only further adds to the complications of dissipating heat. What is needed is electrical insulation that can conduct heat higher than that of conventional methods, but that does not compromise the electrical insulation and other performance factors including mechanical and thermal capability.

Other difficulties with the prior art also exist, some of which will be apparent upon further reading.

SUMMARY OF THE INVENTION

With the foregoing in mind, methods and apparatuses consistent with the present invention, which inter alia facilitates the thermal conductivity of insulating materials by producing a mica and hexagonal boron nitride (hBN) composition. Depending on the size distribution of the mica and hBN components, the composition will be used to produce an insulating paper or a powder that can be combined with various materials, such as resins, that are useable as moldable and extrudeable insulators.

The mica-hBN composition of the present invention can also be impregnated with other types of high thermal conductivity (HTC) fillers to further increase thermal conductivity and other physical properties. If insulating paper is formed from the composition, the insulating paper may stand alone or be combined with other materials to form an insulating tape. These other materials typically comprise a fibrous backing, such a glass, and a resin impregnator. The other materials may also be mixed with HTC materials to produce a combined HTC material tape product.

These and other objects, features, and advantages in accordance with the present invention are provided particular embodiments by an electrical insulation component that comprises mica flakelets, which have an average size range of 0.01 to 0.05 mm in their thinnest dimension, and hexagonal boron nitride, which has an average size range of 10 to 10,000 nm in their longest dimension, and a resin matrix. In other aspects, the hexagonal boron nitride has an average size range of 10-100 nm and a ratio of hexagonal boron nitride to mica between 1:100 and 1:20 by weight, or an average size range of 100-1000 nm, and ratio between 1:50 and 1:10 by weight, or an average size range of 1000 nm to 10,000 nm, ratio between 1:10 and 1:2 by weight. The mica flakelets and the hexagonal boron nitride are mixed, and the ratio by weight of the hexagonal boron nitride to the mica flakelets is directly proportional to the average size of the hexagonal boron nitride compared to the average size of the mica flakelets, within an adjustment factor of 0.5 to 2, and, the ratio by weight of the hexagonal boron nitride to the mica flakelets is never greater than approximately 1:1 by weight.

In another embodiment, the present invention provides a particular aspect of the electrical insulation component that comprises high thermal conductivity fillers, which can be comprised of silica, alumina, magnesium oxide, silicon carbide, boron nitride, aluminum nitride, aluminum oxide, zinc oxide, titanium oxide and diamonds and dendrimers of approximately 1-1000 nm in size, and such high thermal conductivity materials have aspect ratios of 10-50. In a particular aspect, the high thermal conductivity fillers are loaded into the resin, and the high thermal conductivity material comprises 25-40% by volume of the resin.

In another embodiment of the present invention, in the electrical insulation component, the mica flakelets and the hexagonal boron nitride are formed into a paper, and in one aspect, the resin is impregnated into the mica flakelets and the hexagonal boron nitride after the paper is formed. In a related embodiment, the mica flakelets and the hexagonal boron nitride are mixed with the resin to form a putty or dough compound of very high viscosity suitable for use as dough moulding compounds.

In another embodiment, the present invention provides for an electrical insulation paper that comprises mica flakelets, having an average size range of 0.01 to 0.05 mm in their thinnest dimension, hexagonal boron nitride, which has an average size range of 10 to 1,000 nm in their longest dimension, and a resin matrix. The mica flakelets and the hexagonal boron nitride are mixed and formed into a paper, and the resin is added to the paper after formation, the ratio by weight of the hexagonal boron nitride to the mica flakelets is directly proportional to the average size of the hexagonal boron nitride compared to the average size of the mica flakelets, within an adjustment factor of 0.5 to 2, and the ratio by weight of the hexagonal boron nitride to the mica flakelets is never greater than approximately 1:1 by weight.

In another embodiment, the present invention provides for an electrical insulation composite that comprises a mixture of platelet boron nitride, (and in a more particular aspect, hexagonal boron nitride), and mica flakelets, the ratio of which is directly proportional to the average size ranges within a factor of 0.5 to 2. The hexagonal boron nitride has an average size range of 10 to 10,000 nm in their longest dimension, and in a more particular aspect, the boron nitride has an average size range of 1000 nm to 10,000 nm, and the factor is greater than 1. Finally, in this embodiment, the electrical insulation composite is combined with a resin matrix. In a more particular aspect of the electrical insulation composite, the mica flakelets have an average size range of 1000 nm to 10,000 nm and the ratio of the platelet boron nitride to the mica flakelets is approximately 1:1, and in a more particular aspect, the resin forms a paste with the composite.

Other embodiments of the present invention also exist, which will be apparent upon further reading of the detailed description.

BRIEF DESCRIPTION OF THE FIGURES

The invention is explained in more detail by way of example with reference to the following drawings.

DETAILED DESCRIPTION OF THE INVENTION

Figure 1:
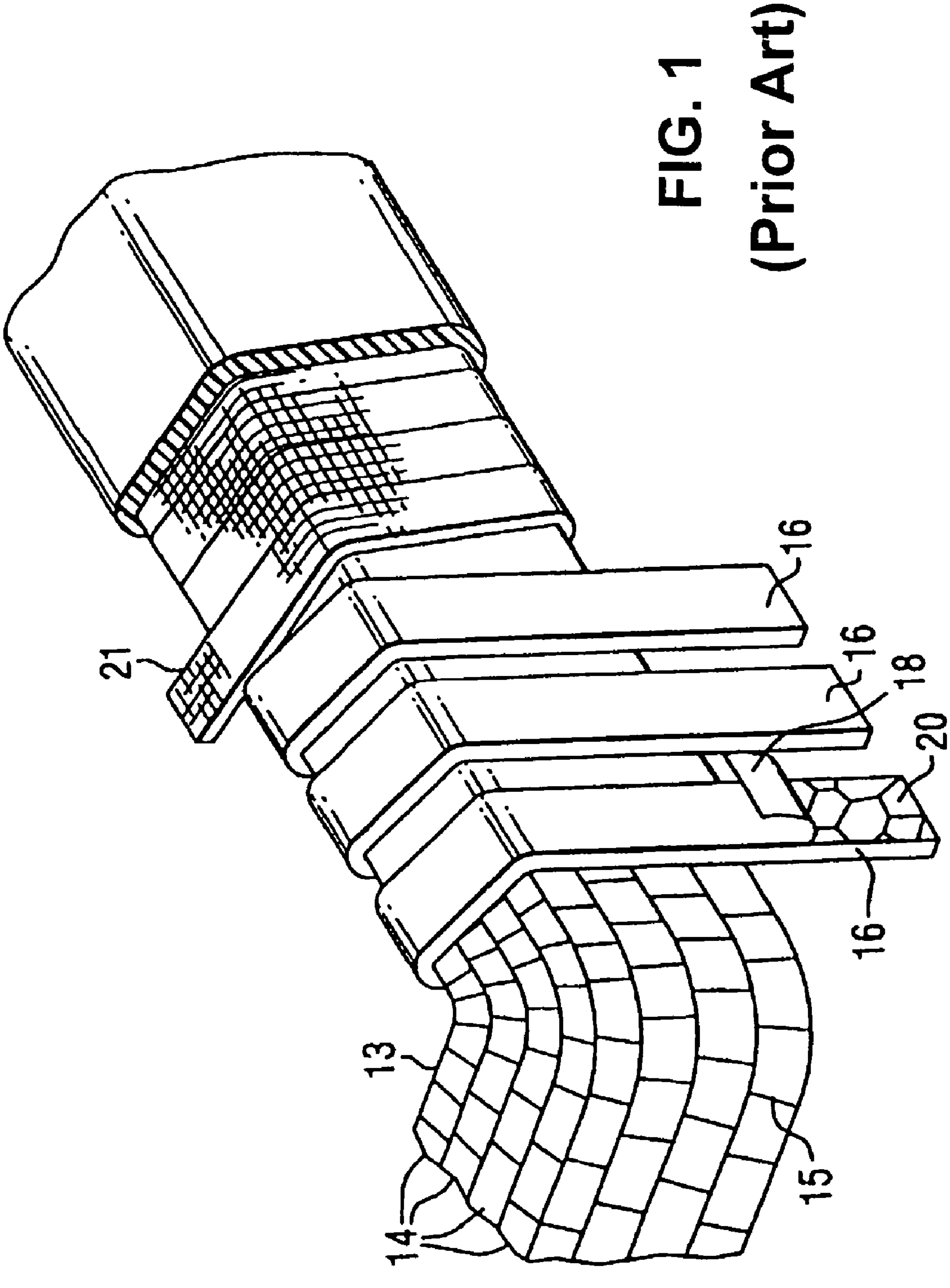
FIG. 1 (Prior Art)
FIG. 1 shows the use of an insulating tape being lapped around a stator coil.

The present invention provides for the combination of platelet boron nitride, and in particular hexagonal boron nitride (hBN), in the range of 10-10,000 nm in length, which is combined with mica to produce a highly thermally conductive composition. Mica has a structure which enables it to be split into platelet form, which can easily be formed into products such as a layered paper, and then the paper can be formed into an insulating tape. The present invention uses similar properties in boron nitride to substitute some of the mica material for a higher thermally conducting boron nitride material.

One of the reasons that mica is a great insulator is the size of the mica flakes and flakelets. The size ranges that the mica can be formed into can be varied, but generally the mica is in the macro sized (0.01-0.05 mm) thickness range with longest platelet dimensions typically up to 10 mm, range for naturally occurring and conventionally processed micas (including all known common mineral forms). For synthetic micas the longest dimension size range may be in the micron and sub-micron range from 100 nm to 10,000 nm. In insulating tapes, the mica paper is combined with a backing fabric for strength, such as a glass matt or fabric. This can then later be mixed or impregnated with a resin.

Mica is not only good at forming paper, but since the platelets create high tortuosity pathways for electrical treeing processes, it also makes an excellent electrical insulation material. Mica, unfortunately, is also very thermally insulating as well, which is an undesired side effect. Attempts have been made to combine the mica with other materials to improve the thermal conductivity, but one of the challenges is to not compromise too greatly the mechanical stability and dielectric strength properties of the mica.

Microscopic platelet hBN, has a similar platelet morphology to mica, with a much greater thermal conductivity, and comparable mechanical stability in regard to shear cleaving (or delamination) in the plane of the sheet or particle. When comparing similar size scales, the hBN commonly has smaller dimensions in the planar directions than mica, and is much smaller in the thickness dimension normal to the plane, giving it in some forms a comparable aspect ratio to that of mica platelets or a greater aspect ratio than mica. In particular, hBN can readily be created in the desired microscopic size ranges, and it is commercially available. Although hBN is an ideal type of platelet BN, other forms of platelet BN also exist, such as rhombohedral.

The size ranges of hBN that are combined with the mica produce different types of physical properties according to the composition used. This is then manipulated to vary mechanical stability and thermal conductivity of the resulting composite. The larger the weight fraction of hBN used, the greater the thermal conductivity in the resulting composition, but the weaker the mechanical strength. The larger the average size of the hBN used the weaker the mechanical strength.

Higher strength compositions can be used to produce paper with good mechanical integrity. While weaker strength compositions can be used as a powder filler to enhance the thermal conductivity and dielectric proprieties of various matrices. A particular type of matrix is a resin that, when combined with the mica-hBN compositions, can be impregnated, cast, extruded, coated or even used as a paste, putty or a dough moulding compound. In these process methods viscosity control is important and such control can be achieved by changing the concentration and particle size distribution of both the mica and the hBN components.

Further, other types of HTC materials, particularly those of the nano (1-1000 nm) scale, can be combined with the mica-hBN composition to further enhance thermal conductivity and mechanical properties. The HTC materials can also be added to the resulting products to which the composition is added, such as a tape. Types of HTC fillers include metal oxides, nitrides, carbides and mixed stoichiometric and non-stoichiometric combinations, which are discussed more below.

The size ranges of the hBN can be broken down into three categories, which impart general characteristics and particular uses to the ensuing composition. The mica, on the other hand, is commonly of the macro scale (eg: mm size range) which contributes better to mechanical strength and a higher dielectric strength by creating higher tortuosity structures in the insulating products. An exception to this is to use micro sized mica particles when producing extrudable insulating materials.

The three categories of hBN are nano, meso and micro, which will have an average size distribution of 10-100 nm, 100-1000 nm and 1000 nm to 10,000 nm in their planar length. The hBN increases thermal conductivity, but in relation to the mica it will weaken the mechanical stability of paper forming compositions by interrupting the mica-mica particle bonding but it will support the maintaining of good electrical insulation properties.

The ratio of hBN to mica by weight will depend on the properties sought. For mechanically stable papers nano sized hBN mixed with macro sized mica can be done with approximately 1-5% by weight hBN. A meso hBN with a macro mica in the range of about 2-10% by weight may also produce a mechanically stable paper, but the use of micro sized hBN with a macro mica will produce a mechanically unstable paper above 1% hBN. Higher weight fraction compositions than these will produce mechanically weak mats or powders that can be mixed with or impregnated by resins to enable processing by compression of flow molding, flow casting, extrusion coating and putty or dough moulding application. Control of the weight ratios and particle size distribution will produce the desired physical properties of the resulting insulating materials formed from the composition.

For nano sized hBN, the composition can be formed into a self supporting paper with high thermal conductivity. The large mica flakes will form the bulk of the paper, while the smaller hBN will improve phonon transport. In particular, the smaller hBN will collect in the mica paper pore regions, which are prone to poor thermal conduction.

A meso sized hBN will have a higher loading on the mica than the nano sized. The composition will still be able to form a self supporting paper, but this will be weaker than the paper formed with nano sized hBN since the hBN will interfere with some of the mica to mica bonding.

A micro sized hBN with a macro sized mica will produce a two phase composition that can be processed as a powder form. This powder can then be combined with a resin matrix to produce liquid insulation materials which can be processed by casting, extrusion, coating and other means and then converted to solids by reaction of the resin.

A micro sized hBN can also be combined with similarly sized mica platelets. This will form a powder, that when combined with a host resin matrix will produce insulating substances that are moldable and extrudable.

Figure 2:
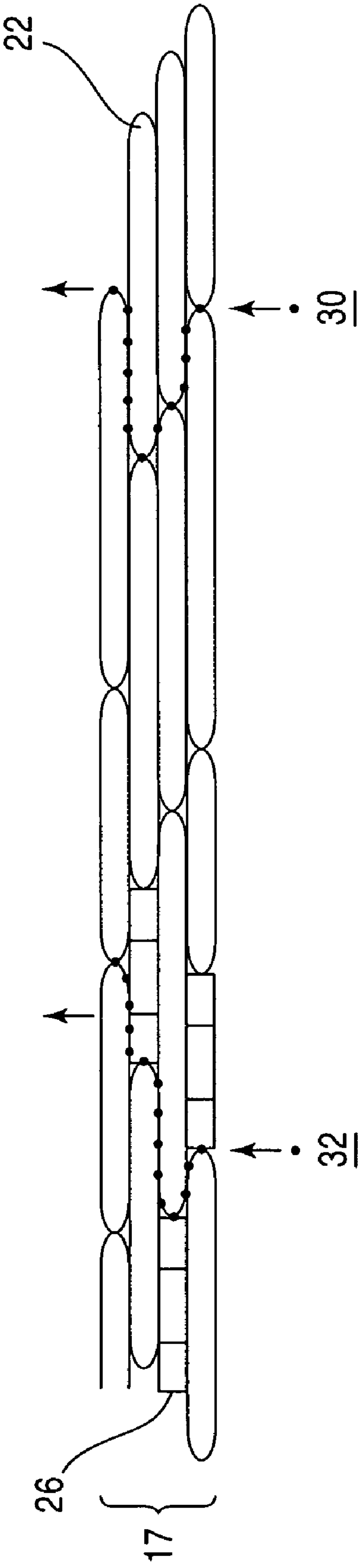
FIG. 2 illustrates a stylize of mobile electric charge (e.g. mobile positive or negative ions, electrons and holes) flowing through a paper made according to the present invention.

One of the reasons that mica is such a good electrical insulator is that it creates a tortuous path for the transport of electric charge (ions, electrons and holes). This is illustrated in FIG. 2, where an electron 30 in order to pass through a section of composite paper 17, is required to by pass large overlapping flakelets of mica 22. Platelet BN, such as hBN 26 serves a similar function 32. The platelet BN has similar resistivity as mica, as well as good mechanical stability properties. When combined with mica flakelets, it compliments the tortuous path that electrical propagation much take through the insulating material.

In one embodiment, the present invention provides for an electrical insulation component that comprises mica flakelets, which have an average size range of 0.01 to 0.05 mm in their thickness dimension, and hexagonal boron nitride, which has an average size range of 10 to 10,000 nm in their longest dimension, and a resin matrix. In other aspects, the hexagonal boron nitride has an average size range of 10-100 nm and a ratio of hexagonal boron nitride to mica between 1:100 and 1:20 by weight, or an average size range of 100-1000 nm, and ratio between 1:50 and 1:10 by weight, or an average size range of and 1000 nm to 10,000 nm, ratio between 1:10 and 1:2 by weight. The mica flakelets and the hexagonal boron nitride are mixed, and the ratio by weight of the hexagonal boron nitride to the mica flakelets is directly proportional to the average size of the hexagonal boron nitride compared to the average size of the mica flakelets, within an adjustment factor of 0.5 to 2, and, the ratio by weight of the hexagonal boron nitride to the mica flakelets is never greater than approximately 1:1 by weight.

In another embodiment, the present invention provides a particular aspect of the electrical insulation component that comprises high thermal conductivity fillers, which can be comprised of silica, alumina, magnesium oxide, silicon carbide, boron nitride, aluminum nitride, zinc oxide and diamonds and dendrimers of approximately 1-1000 nm in size, and such high thermal conductivity materials have aspect ratios of 10-50. In a particular aspect, the high thermal conductivity fillers are loaded into the resin, and the high thermal conductivity material comprises 25-40% by volume of the resin.

In another embodiment of the present invention, in the electrical insulation component, the mica flakelets and the hexagonal boron nitride are formed into a paper, and in one aspect, the resin is impregnated into the mica flakelets and the hexagonal boron nitride after the paper is formed. In a related embodiment, the mica flakelets and the hexagonal boron nitride are mixed with the resin to form a putty including a dough moulding compound.

In another embodiment, the present invention provides for an electrical insulation paper that comprises mica flakelets, having an average size range of 0.01 to 0.05 mm in their thinnest dimension, hexagonal boron nitride, which has an average size range of 10 to 1,000 nm in their longest dimension, and a resin matrix. The mica flakelets and the hexagonal boron nitride are mixed and formed into a paper, and the resin is added to the paper after formation, the ratio by weight of the hexagonal boron nitride to the mica flakelets is directly proportional to the average size of the hexagonal boron nitride compared to the average size of the mica flakelets, within an adjustment factor of 0.5 to 2, and the ratio by weight of the hexagonal boron nitride to the mica flakelets is never greater than approximately 1:1 by weight.

In another embodiment, the present invention provides for an electrical insulation composite that comprises a mixture of platelet boron nitride, (and in a more particular aspect, hexagonal boron nitride), and mica flakelets, the ratio of which is directly proportional to the average size ranges within a factor of 0.5 to 2. The hexagonal boron nitride has an average size range of 10 to 10,000 nm in their longest dimension, and in a more particular aspect, the boron nitride has an average size range of 1000 nm to 10,000 nm, and the factor is greater than 1. Finally, in this embodiment, the electrical insulation composite is combined with a resin matrix. In a more particular aspect of the electrical insulation composite, the mica flakelets have an average size range of 1000 nm to 10,000 nm and the ratio of the platelet boron nitride to the mica flakelets is approximately 1:1, and in a more particular aspect, the resin forms a paste with the composite.

In regards to insulating papers, they tend to comprise a host matrix, such as mica, that is formed into a paper that is often then impregnated with resin or accelerator or both. Before or after being impregnated, the paper used in tapes is added to a high tensile strength backing, such as glass or polymer film. The host matrix of an insulating tape acts as a very good electrical insulator, but also insulates thermally as well, which is an undesired side effect.

It is desirable to increase the thermal conductivity of the substrate, which as discussed above can be formed from a mica-hBN. As used herein substrate refers to the host material that the insulating paper is formed from, while matrix refers to the more complete paper component made out of the substrate. These two terms may be used somewhat interchangeably. Matrix can also refer to host resins, which can then be combined with a host tape, both of which can severally be impregnated with HTC materials. The increase of thermal conductivity should be accomplished without significantly impairing the electrical properties, and dielectric properties such as dissipation factor, or the mechanical properties of the substrate, such as tensile strength and cohesive properties. The physical properties can even be improved in some embodiments, such as with surface coatings. In addition, in some embodiments the electrical resistivity of the host matrix can also be enhanced by the addition of HTC materials.

The HTC materials can be added to the substrate or matrix at one or more of the various stages of manufacture of the insulating paper. Distinct stages in the manufacture of an insulating paper exist. These can be separated into three stages. The raw material stage, the slurry stage, and the paper product stage. For example, a mica paper begins as mica which is converted to flakes then to mica flakelets that are then combined with a liquid into a slurry, which is then run through a machine to produce a mica paper.

In addition to the standard mica (Muscovite, Phlogopite) that is typically used for electrical insulation there is also Biotite mica as well as several other Mica-like Alumino-Silicate materials such as Kaolinite, Halloysite, Montmorillonite and Chlorite. Montmorillonite has lattices in its structure which can be readily intercalated with HTC materials such as metal cations, organic compounds and monomers and polymers to give high dielectric strength composites.

The addition of HTC materials can occur at any or all of the production stages. Each of these stages, of course, will comprise of multiple sub-stages at which the HTC material may be added. The process of applying the HTC materials at the various stages will have to account for the difference in physical characteristics of the host matrix at these various stages. For example, adding the HTC materials to loose mica flakes or mica flakelets is different than adding the materials to the mica in the slurry or the paper product. HTC materials may also be present in other component parts of the finished insulating tape, such as the backing fabric, or the interlayer bonding resins.

The process of manufacture of insulating paper combines thermal, chemical, and mechanical treatments individually or in combinations, to produce a pulp that is then transformed into sheets that make up the paper. HTC-materials can be added to the raw material stage either in the dry form or contained in a liquid or other medium. The HTC material is added to the substrate, such as dry mica flakelets, and intermixed to form, in one instance, a homogeneous distribution within the substrate. Methods such as heat may be used to remove the liquid medium that delivers the HTC materials to the substrate.

HTC materials are incorporated into the matrix at the slurry stage by adding them to a suspension in an agglomerated or non-agglomerated form in a liquid carrier. Aggregation of the HTC material is generally not preferred at this stage but in some cases it may be used depending on the nature of the aggregate structure. Surfactants, chemical surface preparation, or pH control may be used to ensure the particles do not aggregate or that they aggregate in particular ways. If the HTC are to some degree self aligning or can be aligned by external forces then full dispersion on mixing may not be necessary.

In the slurry stage the fillers may either be added as a powder or as a suspension in a liquid phase. The liquid can be of a variety of types used in the art, though water is typical. The water itself can be deionized, demineralized, or have additives to control its pH value.

To add the HTC materials into the paper product the fillers may be incorporated into a suitable solvent as a suspension. Examples are typical organic solvents such as hexane, toluene, methylethylketone etc. Similarly, it is desired that the HTC material be uniformly distributed in the liquid as a non-aggregated suspension. The size distribution of the particles may be chosen to fulfill the desired objective in relation to the void size distribution in host matrix. The HTC material size and shape distribution may be employed to influence the thermal conductivity and other physical properties, and use can be made of the different close packing behavior of such components or of their different aggregation or self-assembling behavior, to achieve this.

At the slurry or paper product stage, the solvents may also contain one or more accelerators, such a zinc naphthenate and other metal-salts or organometallics, which may be used to accelerate the reaction of a later impregnated resin. HTC material can be added together with the accelerator in a common solvent or accelerator.

HTC materials are inserted into a host matrix, or substrate, such as a mica and polyester. Other substrate components include glass flakes, and Kapton™, which is a polyimide, or Mylar™ which is a polyester such as polyethylene terephthalate. The HTC materials can be applied to any and all external and internal surfaces. Although flakes are a common first stage substrate, some types of substrate materials may use different physical formations, or even combinations of physical formations that can form composite paper that can be multi-layered or continuous.

The term HTC material refers to particles that increase the thermal conductivity of the host matrix. In one embodiment these are nanofillers having dimensions of about 1-1000 nm. These may be spherical, platelets or have a high aspect ratio such as whiskers, rods or nanotubes, and their related assembled forms such as aggregates, fibrillar dendrites, ropes, bundles and nets and other forms. In addition, HTC materials also refers to coatings, such as diamond like coatings (DLC) and various metal oxides, nitrides, carbides and mixed stoichiomertric and non-stoichiometric combinations that can be applied to the host matrix. As will be discussed, it is possible to combine HTC materials, such as combination of nano, meso or micro spheres and rods, or a DLC or metal oxide coating on nano, meso or micro particulates. It is also important to note that there may be diamond nanofillers of various forms, which are distinct from diamond like coatings. Since many paper insulators are eventually impregnated with resins, it is an objective of these embodiments that the HTC materials increase the thermal conductivity of the matrix after impregnation. After impregnation the particles may cause an increase in thermal conductivity by forming a thermally conducting network on the surfaces of the host matrix particles or with the impregnating resin or some combination of both. The impregnating resin may also have HTC materials of its own, which can act in conjunction with, or independent of the HTC materials intercalated with the insulating paper.

The HTC materials therefore further comprise nano, meso, and micro inorganic HTC-materials such as silica, alumina, magnesium oxide, silicon carbide, boron nitride, aluminium nitride, zinc oxide and diamond, as well as others that give higher thermal conductivity. These materials can have a variety of crystallographic and morphological forms and they may be processed with the host matrix either directly or via a solvent which acts as a carrier liquid. Solvents may be the preferred delivery system when the HTC-materials are added into the matrix at stages such as the paper product.

In one embodiment, the HTC materials are dendrimers, and in another embodiment they are nano or micro inorganic fillers having a defined size or shape including high aspect ratio particles with aspect ratios (ratio mean lateral dimension to mean longitudinal dimension) of 3 to 100 or more, with a more particular range of 10-50.

In one embodiment the surface coating of nano, meso and micro inorganic fillers having the desired shape and size distribution and the selected surface characteristics and bulk filler properties are complimentary to each other. This enables better percolation of the host matrix and independent interconnection properties are controlled independently while maintaining required bulk properties.

In regards to shape, utilize shapes tending towards natural rods and platelets for enhanced percolation in the host matrix with rods being the most preferred embodiment including synthetically processed materials in addition to those naturally formed. A rod is defined as a particle with a mean aspect ratio of approximately 5 or greater, with particular embodiments of 10 or greater, though with more particular embodiments of no greater than 100. In one embodiment, the axial length of the rods is approximately in the range 10 nm to 100 microns. Smaller rods will percolate a host matrix better when added to a finished host matrix using a solvent.

Many micro particles form spheroidal, ellipsoidal and discoidal shapes, which have reduced ability to distribute evenly under certain conditions and so may lead to aggregated filamentary structures that reduce the concentration at which percolation occurs. By increasing the percolation, the thermal properties of the substrate can be increased, or alternately, the amount of HTC material that needs to be added to the substrate can be reduced. Also, the enhanced percolation results in a more uniform distribution of the HTC materials within the substrate rather than agglomeration which is to be avoided, creating a more homogenous product that is less likely to have undesired interfaces, incomplete particle wetting and micro-void formation. Likewise aggregated filamentary or dendritic structures, rather than globular (dense) aggregates or agglomerates, formed from higher aspect ratio particles confer enhanced thermal conductivity In one embodiment the dendrimer comprises discrete organic-dendrimer composites in which the organic-inorganic interface is non-discrete with the dendrimer core-shell structure. Dendrimers are a class of three-dimensional nanoscale, core-shell structures that build on a central core. The core may be on of an organic or inorganic material. By building on a central core, the dendrimers are formed by a sequential addition of concentric shells. The shells comprise branched molecular groups, and each branched shell is referred to as a generation. Typically, the number of generations used is from 1-10, and the number of molecular groups in the outer shell increase exponentially with the generation. The composition of the molecular groups can be precisely synthesized and the outer groupings may be reactive functional groups. Dendrimers are capable of linking with a host matrix, as well as with each other. Therefore, they may be added to a host as an HTC material.

Generally, the larger the dendrimer, the greater its ability to function as a phonon transport element. However, its ability to permeate the material and its percolation potential can be adversely affected by its size so optimal sizes are sought to achieve the balance of structure and properties required. Like other HTC materials, solvents can be added to the dendrimers so as to aid in their impregnation of a substrate, such as a mica or a glass tape. In many embodiments, dendrimers will be used with a variety of generations with a variety of different molecular groups.

Commercially available organic Dendrimer polymers include Polyamido-amine Dendrimers (PAMAM) and Polypropylene-imine Dendrimers (PPI) and PAMAM-OS which is a dendrimer with a PAMAM interior structure and organo-silicon exterior. The former two are available from Aldrich Chemical™ and the last one from Dow-Corning™.

Similar requirements exist for inorganic-organic dendrimers which may be reacted together or with the substrate. In this case the surface of the dendrimer could contain reactive groups similar to those specified above which will either allow dendrimer-dendrimer, dendrimer-organic, dendrimer-hybrid, and dendrimer-HTC matrix reactions to occur. In this case the dendrimer will have an inorganic core and an organic shell, or vice-versa containing either organic or inorganic reactive groups or ligands of interest. It is therefore also possible to have an organic core with an inorganic shell which also contains reactive groups such as hydroxyl, silanol, vinyl-silane, epoxy-silane and other groupings which can participate in inorganic reactions similar to those involved in common sol-gel chemistries.

The molecular groups can be chosen for their ability to react, either with each other or with a substrate. However, in other embodiments, the core structure of the dendrimers will be selected for their own ability to aid in thermal conductivity; for example, metal oxides as discussed below.

Electrical insulation materials can be based on organic-inorganic composites. The thermal conductivity is optimized without detrimentally affecting other insulation properties such as dielectric properties (permittivity and dielectric loss), electrical conductivity, electric strength and voltage endurance, thermal stability, tensile modulus, flexural modulus, impact strength and thermal endurance in addition to other factors such as viscoelastic characteristics and coefficient of thermal expansion, and overall insulation. Organic and inorganic phases are constructed and are selected to achieve an appropriate balance of properties and performance.

Micro and nano HTC particles may be selected on their ability to self aggregate into desired shapes, such as rods and platelets. Particles may be selected for their ability to self-assemble naturally, though this process may also be amplified by external forces such as an electric field, magnetic field, sonics, ultra-sonics, pH control, use of surfactants and other methods to affect a change to the particle surface charge state, including charge distribution, of the particle. In a particular embodiment, particles that exemplify surface coatings, such as boron nitride, aluminum nitride, diamond are made to self assemble into desired shapes. In this manner, the desired rod-shapes can be made from highly thermally conductive materials at the outset or assembled during incorporation into the host matrix.

In many embodiments, the size and shape of the HTC-materials are varied within the same use. Ranges of size and shape are used in the same product. A variety of long and shorter variable aspect ratio HTC-materials will enhance the thermal conductivity of a host matrix, as well as potentially provide enhanced physical properties and performance. One aspect that should be observed, however, is that the particle length does not get so long as to cause bridging between layers of substrate/insulation unless this is by design. Also, a variety of shapes and length will improve the percolation stability of the HTC-materials by providing a more uniform volume filing and packing density, resulting in a more homogeneous matrix. When mixing size and shapes, in one embodiment the longer particles are more rod-shaped, while the smaller particles are more spheroidal, platelet or discoid and even cuboids. For example a matrix containing HTC-materials could-contain as low as about 0.1% to as high as 65% HTC materials by volume, with a more particular range begin about 1-25% by volume.

In a related embodiment, the HTC materials may have a defined size and shape distribution. In both cases the concentration and relative concentration of the filler particles is chosen to enable a bulk connecting (or so-called percolation) structure to be achieved which confers high thermal conductivity with and without volume filling to achieve a structurally stable discrete two phase composite with enhanced thermal conductivity. In another related embodiment, the orientation of the HTC materials increases thermal conductivity. In still another embodiment, the surface coating of the HTC materials enhances phonon transport. These embodiments may stand apart from other embodiments, or be integrally related. For example, dendrimers are combined with other types of highly structured materials such as thermoset and thermoplastic materials. They are uniformly distributed through a host matrix such that the HTC materials reduce phonon scattering and provide micro-scale bridges for phonons to produce good thermally conducting interfaces between the HTC materials. The highly structured materials are aligned so that thermal conductivity is increased along a single direction to produce either localized or bulk anisotropic electrically insulating materials. In another embodiment HTC is achieved by surface coating of lower thermal conductivity fillers with metal oxides, carbides or nitrides and mixed systems having high thermal conductivity which are physically or chemically attached to fillers having defined bulk properties, such attachment being achieved by processes such as chemical vapour deposition and physical vapour deposition and also by plasma treatment.

The addition of surface functional groups may include hydroxyl, carboxylic, amine, epoxide, silane or vinyl groups which will be available for chemical reaction with the host matrix. These functional groups may be naturally present on the surface of inorganic fillers or they may be applied using wet chemical methods, non-equilibrium plasma deposition including plasma polymerization, chemical vapour and physical vapour deposition, sputter ion plating and electron and ion beam evaporation methods.

Organic surface coatings, and inorganic surface coatings such as, metal-oxide, -nitride, -carbide and mixed systems may be generated which, when combined with the selected particle size and shape distribution, provide a defined percolation structure with control of the bulk thermal and electrical conductivity of the insulation system while the particle permittivity may be chosen to control the permittivity of the system.

Reactive surface functional groups may be formed from surface groups intrinsic to the inorganic coating or may be achieved by applying additional organic coatings both of which may include hydroxyl, carboxylic, amine, epoxide, silane, vinyl and other groups which will be available for chemical reaction with the host matrix. These single or multiple surface coatings and the surface functional groups may be applied using wet chemical methods, non-equilibrium plasma methods including plasma polymerization and chemical vapour and physical vapour deposition, sputter ion plating and electron and ion beam evaporation methods.

Diamond-Like Carbon Coatings (DLC) have high hardness, low friction, chemical inertness, and can combine high electrical resistivity (~$10^{13}$ Ohm cm) for electrical insulation with high thermal conductivity (>1000 W/mK). There are several methods for producing a DLC, such as plasma assisted chemical vapor deposition (PACVD), physical vapor deposition (PVD), and ion beam deposition (IBD). In general, the DLC is less than one micron thick and is of amorphous carbon and hydrocarbons which results in mixed $sp^2$ and $sp^3$ bonds. The bond ratio can be varied by varying the process parameters, for example the ratio of gases and DC voltage, with resultant changes in properties. The bond ratio can be directly measured using, for example, Raman spectroscopy.

Relatively large areas can be coated quite quickly. For example using a PICVD low pressure non equilibrium process a 20-100 nm coating can be applied to a glass cloth surface approximately 1 sq ft in area in minutes. To control or optimize the coating parameters to reduce, for example, the stress in the coating the DLC can be applied to a bare substrate or substrates that have other coatings. The DLC can be continuous or have gaps in the coverage. Gaps may be advantageous, for example, in allowing for better bonding of an impregnated resin.

In thermal conductivity, phonon transport is enhanced and phonon scattering reduced by ensuring the length scales of the structural elements are shorter than or commensurate with the phonon distribution responsible for thermal transport. Larger HTC particulate materials can actually increase phonon transport in their own right, however, smaller HTC materials can alter the nature of the host matrix, thereby affect a change on the phonon scattering. This may be further assisted by using nano-particles whose matrices are known to exhibit high thermal conductivity and to ensure that the particle size is sufficient to sustain this effect and also to satisfy the length scale requirements for reduced phonon scattering. It is also necessary to consider the choice of structures that are more highly ordered including reacted dendrimer lattices having both short and longer range periodicity and ladder or ordered network structures that may be formed from matrices.

Applying a DLC to particles of nano, meso, micro and larger dimensions enables the size and shape of the high thermal conductivity particles to be engineered, so benefit can be obtained from percolation effects occurring naturally or created. In one example a DLC is applied to quasi-continuously coat the surface of a glass fiber or number of fibers. The surface of the fiber before coating is chosen to promote the desired properties from the coating. The fiber is then broken up by mechanical or other means into short DLC coated rods of the desired dimensional distribution. In another example a DLC coating is applied to flake-shaped particles having a high surface to thickness ratio, mica flakelets and BN particles being examples.

In poly-crystalline and mono-crystalline nano-particulate form, the particles may associate with the surface of a carrier particle, eg silica. Silica by itself is not a strong thermally conducting material, but with the addition of a surface coating it may become more highly thermally conducting. Silica and other such materials, however, have beneficial properties such as being readily formed into rod-shaped particles, as discussed above. In this manner, various HTC properties can be combined into one product. These coatings may also have application to the latter resin impregnation and to the glass components of the insulating tape.

Additionally, fluid flow fields and electric and magnetic fields can be applied to the HTC materials to distribute them. By using alternating or static electric fields, the rod and platelet shapes can be aligned on a micro-scale. This creates a material that has different thermal properties in different directions. The creation of an electric field may be accomplished by a variety of techniques known in the art, such as by attaching electrodes across an insulated electrical conductor or by use of a conductor in the centre of a material or the insulation system.

Although the present invention has been discussed primarily in use with electrical industries, the invention is equally applicable in other areas. Industries that need to increase heat transference would equally benefit from the present invention. For example, the energy industries, inclusive of oil and gas. Other focuses of the present invention include power electronics, printed circuit boards, conventional electronics, and integrated circuits where the increasing requirement for enhanced density of components leads to the need to remove heat efficiently in local and large areas.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. An electrical insulation system comprising:

mica flakelets, wherein said mica flakelets have an average size range of 0.01 to 0.05 mm in their thinnest dimension;

hexagonal boron nitride, wherein said hexagonal boron nitride has an average size range of 10 to 100 nm in their longest dimension; and a resin matrix;

wherein said electrical insulation system comprises an electrical insulation composite comprising a mixture of said mica flakelets and said hexagonal boron nitride;

wherein a ratio by weight of said hexagonal boron nitride to said mica flakelets in said electrical insulation composite is directly proportional to the average size of said hexagonal boron nitride compared to the average size of said mica flakelets, within an adjustment factor of 0.5 to 2; and wherein the ratio by weight of said hexagonal boron nitride to said mica flakelets in said electrical insulation composite is between 1:100 and 1:20 by weight.

2. The electrical insulation system of claim 1, further comprising high thermal conductivity fillers.

3. The electrical insulation system of claim 2, wherein said high thermal conductivity fillers comprises at least one of silica, alumina, magnesium oxide, silicon carbide, boron nitride, aluminum nitride, aluminum oxide, zinc oxide, titanium oxide, diamonds and dendrimers of approximately 1-1000 nm in size, and wherein said high thermal conductivity materials have aspect ratios of 10-50.

4. The electrical insulation system of claim 2, wherein said high thermal conductivity fillers are loaded into said resin matrix and comprise 25-40% by volume of said resin matrix.

5. The electrical insulation system of claim 1, wherein said mixture of mica flakelets and said hexagonal boron nitride are in the form of a paper.

6. An electrical insulation system comprising:

mica flakelets, wherein said mica flakelets have an average size range of 0.01 to 0.05 mm in their thinnest dimension;

hexagonal boron nitride, wherein said hexagonal boron nitride has an average size range of 10 to 1,000 nm in their longest dimension; and a resin matrix;

wherein said electrical insulation system comprises a structurally stable electrical insulation paper consisting of said mica flakelets and said hexagonal boron nitride prior to addition of said resin matrix to said electrical insulation paper;

wherein the ratio by weight of said hexagonal boron nitride to said mica flakelets is directly proportional to the average size of said hexagonal boron nitride compared to the average size of said mica flakelets, within an adjustment factor of 0.5 to 2; and wherein the ratio by weight of said hexagonal boron nitride to said mica flakelets is between 1:100 and 1:20.

7. The electrical insulation system of claim 6, further comprising high thermal conductivity fillers.

8. An electrical insulation system comprising:

an electrical insulation composite comprising a mixture of platelet boron nitride and mica flakelets;

wherein said mica flakelets have an average size range of 0.01 to 0.05 mm in their thinnest dimension;

wherein said platelet boron nitride has an average size range of 10 to 10,000 nm in their longest dimension; and wherein a ratio of said platelet boron nitride to said mica flakelets by weight is directly proportional to the average size ranges of said mica flakelets and said platelet boron nitride within a factor of 0.5 to 2;

wherein the ratio of platelet boron nitride to mica flakelets is between 1:100 and 1:20 by weight; and wherein said electrical insulation composite is combined with a resin matrix to form said electrical insulation system.

9. The electrical insulation system of claim 8, wherein said platelet boron nitride is hexagonal boron nitride.

10. The electrical insulation system of claim 6, wherein the ratio of hexagonal boron nitride to mica flakelets is between 1:100 and 1:20 by weight.

* * * * *